United States Patent
Lius et al.

(10) Patent No.: US 12,536,926 B2
(45) Date of Patent: *Jan. 27, 2026

(54) ELECTRONIC DEVICE

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/931,030

(22) Filed: Oct. 29, 2024

(65) Prior Publication Data

US 2025/0054419 A1 Feb. 13, 2025

Related U.S. Application Data

(63) Continuation of application No. 18/095,510, filed on Jan. 10, 2023, now abandoned, which is a
(Continued)

(30) Foreign Application Priority Data

Dec. 17, 2019 (CN) .......................... 201911299634.0

(51) Int. Cl.
*G06F 3/044* (2006.01)
*G06F 3/041* (2006.01)
(Continued)

(52) U.S. Cl.
CPC ............ *G09F 9/301* (2013.01); *G06F 3/0412* (2013.01); *G06F 3/0445* (2019.05); *G06V 40/1306* (2022.01)

(58) Field of Classification Search
CPC ...... G09F 9/301; G06F 3/0412; G06F 3/0445; G06F 3/0443; G06F 3/0416;
(Continued)

(56) References Cited

U.S. PATENT DOCUMENTS

2015/0070312 A1* 3/2015 Her ........................ G06F 3/0446
345/174
2015/0357395 A1* 12/2015 Cheon .................. H10K 59/131
257/89
(Continued)

*Primary Examiner* — Md Saiful A Siddiqui
(74) *Attorney, Agent, or Firm* — Winston Hsu

(57) ABSTRACT

An electronic device includes a flexible display, a sensor electrode, and a plurality of signal lines. The flexible display includes a plurality of light emitting diodes. The sensor electrode is disposed on the flexible display. The plurality of signal lines is electrically connected to the sensor electrode, wherein the plurality of signal lines includes a mesh structure, the mesh structure includes a first opening, and a second opening adjacent to the first opening, in the at least a portion of a bending region, one of the plurality of light emitting diodes is in the first opening, another one of the plurality of light emitting diodes is in the second opening, and a displaying color of the one of the plurality of light emitting diodes in the first opening is different from a displaying color of the another one of the plurality of light emitting diodes in the second opening.

5 Claims, 9 Drawing Sheets

Related U.S. Application Data continuation of application No. 17/105,413, filed on Nov. 25, 2020, now Pat. No. 11,568,768.

(51) Int. Cl.
  *G06K 9/00* (2022.01)
  *G06V 40/13* (2022.01)
  *G09F 9/30* (2006.01)
(58) Field of Classification Search
  CPC  G06F 2203/04102; G06F 2203/04103; G06V 40/1306
  See application file for complete search history.

(56) References Cited

U.S. PATENT DOCUMENTS

| | | | | |
|---|---|---|---|---|
| 2016/0172623 A1* | 6/2016 | Lee | ............................ | B32B 3/04 |
| | | | | 257/40 |
| 2018/0284934 A1* | 10/2018 | Wu | ........................ | H10K 59/351 |
| 2018/0321708 A1* | 11/2018 | Wu | ........................ | G06F 3/0443 |
| 2021/0303094 A1* | 9/2021 | Kwak | .................... | G06F 3/0443 |
| 2021/0365152 A1* | 11/2021 | Xu | ........................ | G06F 3/0412 |

* cited by examiner

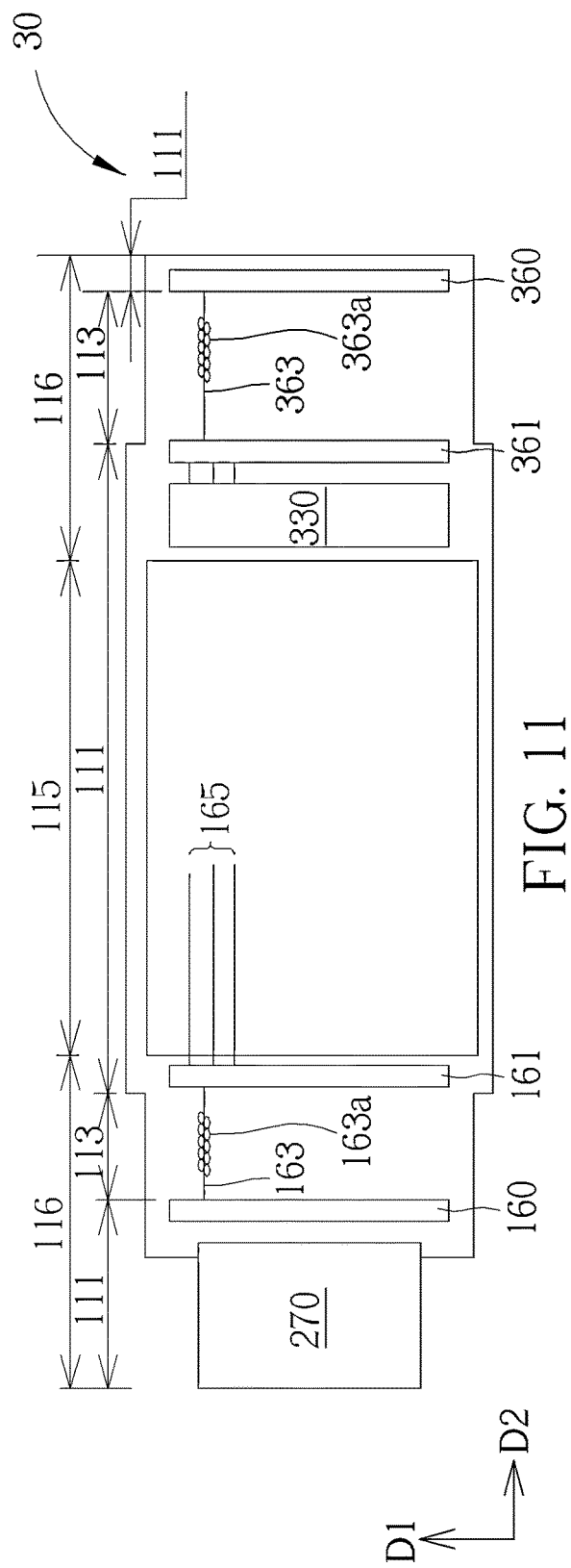
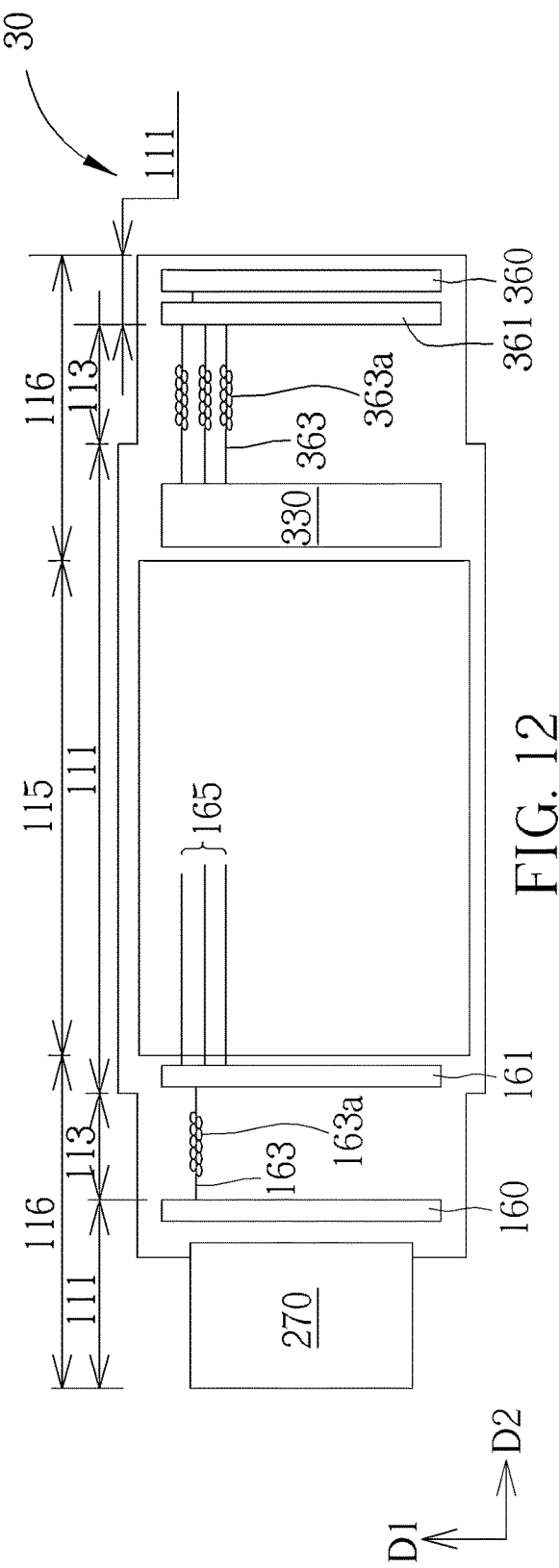
FIG. 11
FIG. 12

ELECTRONIC DEVICE

CROSS REFERENCE TO RELATED APPLICATIONS

This application is a continuation application of U.S. application Ser. No. 18/095,510, filed on Jan. 10, 2023, which is a continuation application of U.S. application Ser. No. 17/105,413, filed on Nov. 25, 2020. The contents of these applications are incorporated herein by reference.

BACKGROUND OF THE DISCLOSURE

1. Field of the Disclosure

The present disclosure relates generally to an electronic device and more particularly, to an electronic device having a flexible display panel.

2. Description of the Prior Art

Electronic products have become an indispensable necessity in modern society. With the fast development of these electronic products, consumers have higher expectations on the quality, the function or the price thereof.

Some of the electronic products have an illuminating function or a displaying function, but none of them have met the requirements in all aspects.

SUMMARY OF THE DISCLOSURE

The present disclosure provides an electronic device including a flexible display, a capacitive fingerprint sensor, a driving circuit and signal lines. The flexible display includes a plurality of light emitting diodes. The capacitive fingerprint sensor is disposed on the flexible display. The signal lines are electrically connecting the capacitive fingerprint sensor and the driving circuit.

The present disclosure also provides an electronic device including a flexible display, a sensor electrode, and a plurality of signal lines. The flexible display includes a plurality of light emitting diodes. The sensor electrode is disposed on the flexible display. The plurality of signal lines is electrically connected to the sensor electrode, wherein the plurality of signal lines includes a mesh structure, the mesh structure includes a plurality of openings, and one of the plurality of light emitting diodes is in one of the plurality of openings.

The present disclosure also provides an electronic device including a flexible display, a sensor electrode, and a plurality of signal lines. The flexible display includes a plurality of light emitting diodes. The sensor electrode is disposed on the flexible display. The plurality of signal lines is electrically connected to the sensor electrode, wherein the electronic device has a bending region, and a flat region connected to the bending region, the plurality of signal lines includes a mesh structure, the mesh structure includes a first opening, and a second opening adjacent to the first opening, in the at least a portion of the bending region, one of the plurality of light emitting diodes is in the first opening, another one of the plurality of light emitting diodes is in the second opening, and a displaying color of the one of the plurality of light emitting diodes in the first opening is different from a displaying color of the another one of the plurality of light emitting diodes in the second opening.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIG. 1 to FIG. 5 are schematic diagrams illustrating an electronic device according to a first embodiment of the present disclosure; in which:

FIG. 1 shows an appearance of the electronic device in bending mode;

FIG. 2 shows another appearance of the electronic device in bending mode;

FIG. 3 shows a partial cross-sectional view of the electronic device in stretching mode;

FIG. 4 shows a disposing view of signal lines in a display of the electronic device; and FIG. 5 shows a disposing view of sensing electrodes in a display of the electronic device.

FIG. 8 to FIG. 10 are schematic diagrams illustrating an electronic device according to a second embodiment of the present disclosure; in which:

FIG. 8 shows a disposing view of sensing electrodes in a display of the electronic device;

FIG. 9 shows an appearance of the electronic device in bending mode; and

FIG. 10 shows another appearance of the electronic device in bending mode.

FIG. 11 to FIG. 12 are schematic diagrams illustrating an electronic device according to a third embodiment of the present disclosure; in which:

FIG. 11 shows a top view of the electronic device in stretching mode;

FIG. 12 shows another top view of the electronic device in stretching mode.

DETAILED DESCRIPTION

The present disclosure may be understood by reference to the following detailed description, taken in conjunction with the drawings as described below. For purposes of illustrative clarity understood, various drawings of this disclosure show a portion of the electronic device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. In the following description and in the claims, the terms "include", "comprise" and "have" are used in an open-ended fashion, and thus should be interpreted to mean "include, but not limited to".

It may also understand that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

As disclosed herein, the term "about" or "substantial" generally means within 20%, 10%, 5%, 3%, 2%, 18, or 0.5% of a given value or range. Unless otherwise expressly specified, all of the numerical ranges, amounts, values and percentages disclosed herein should be understood as modified in all instances by the term "about" or "substantial". Accordingly, unless indicated to the contrary, the numerical parameters set forth in the present disclosure and attached claims are approximations that can vary as desired.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The technical features in different embodiments described in the following can be replaced, recombined, or mixed with one another to constitute another embodiment without departing from the spirit of the present disclosure.

Figure 1:
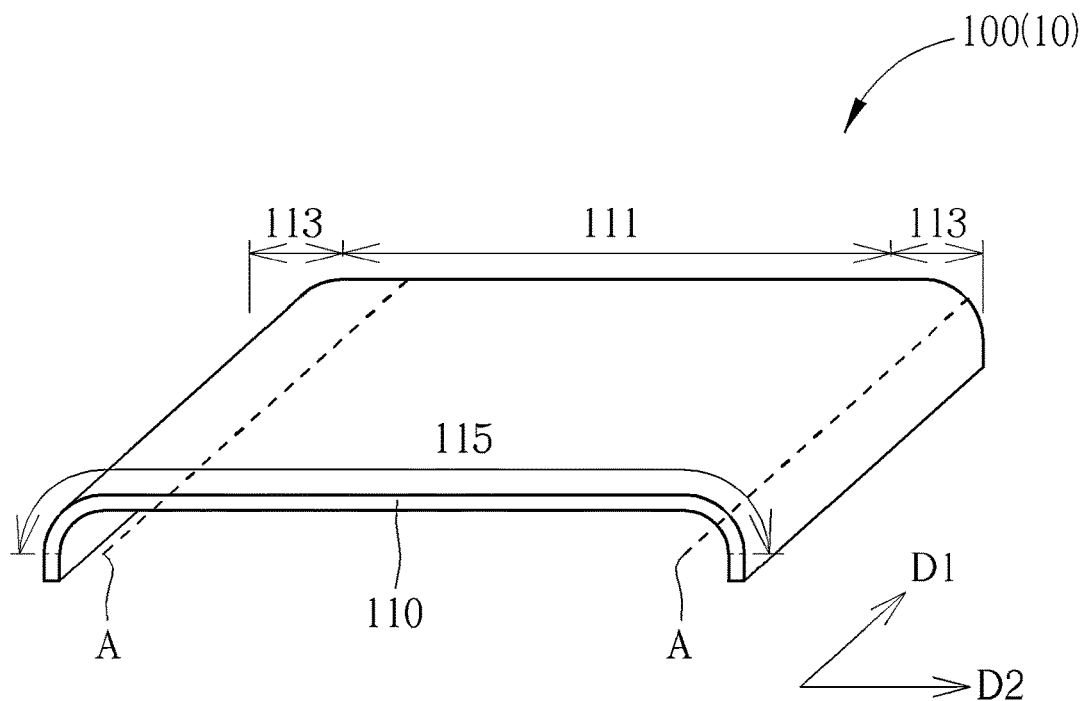
Figure 2:
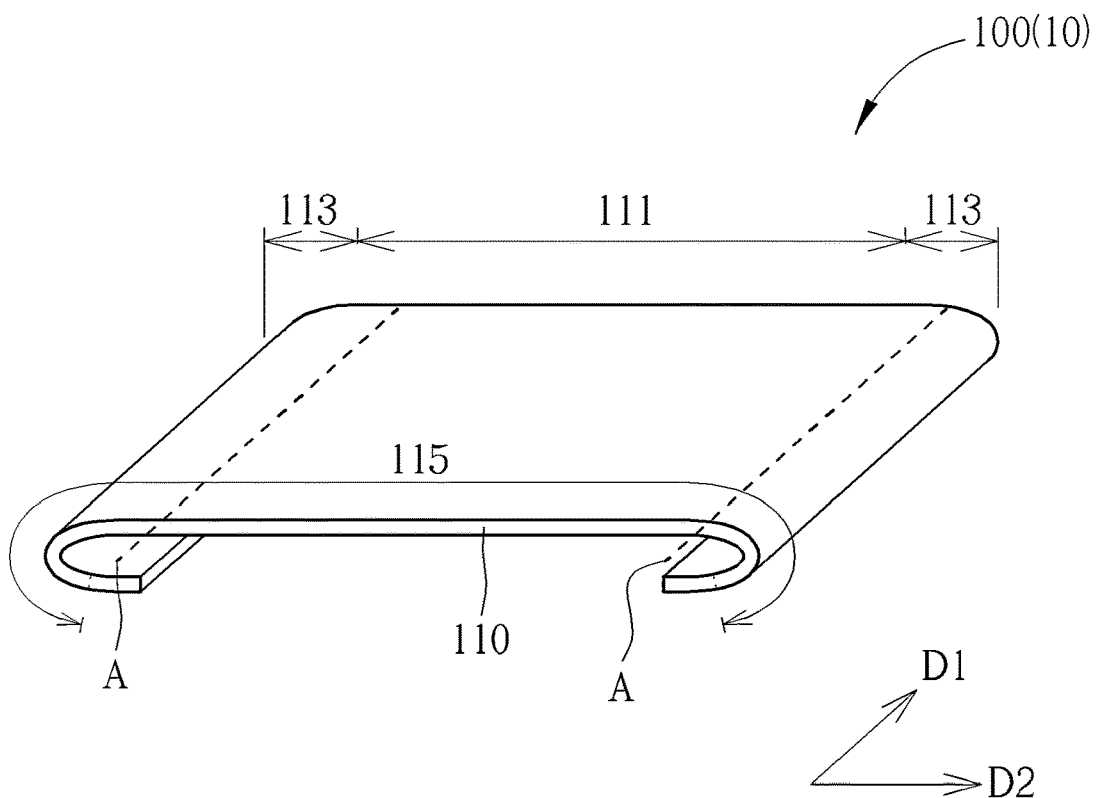
Figure 3:
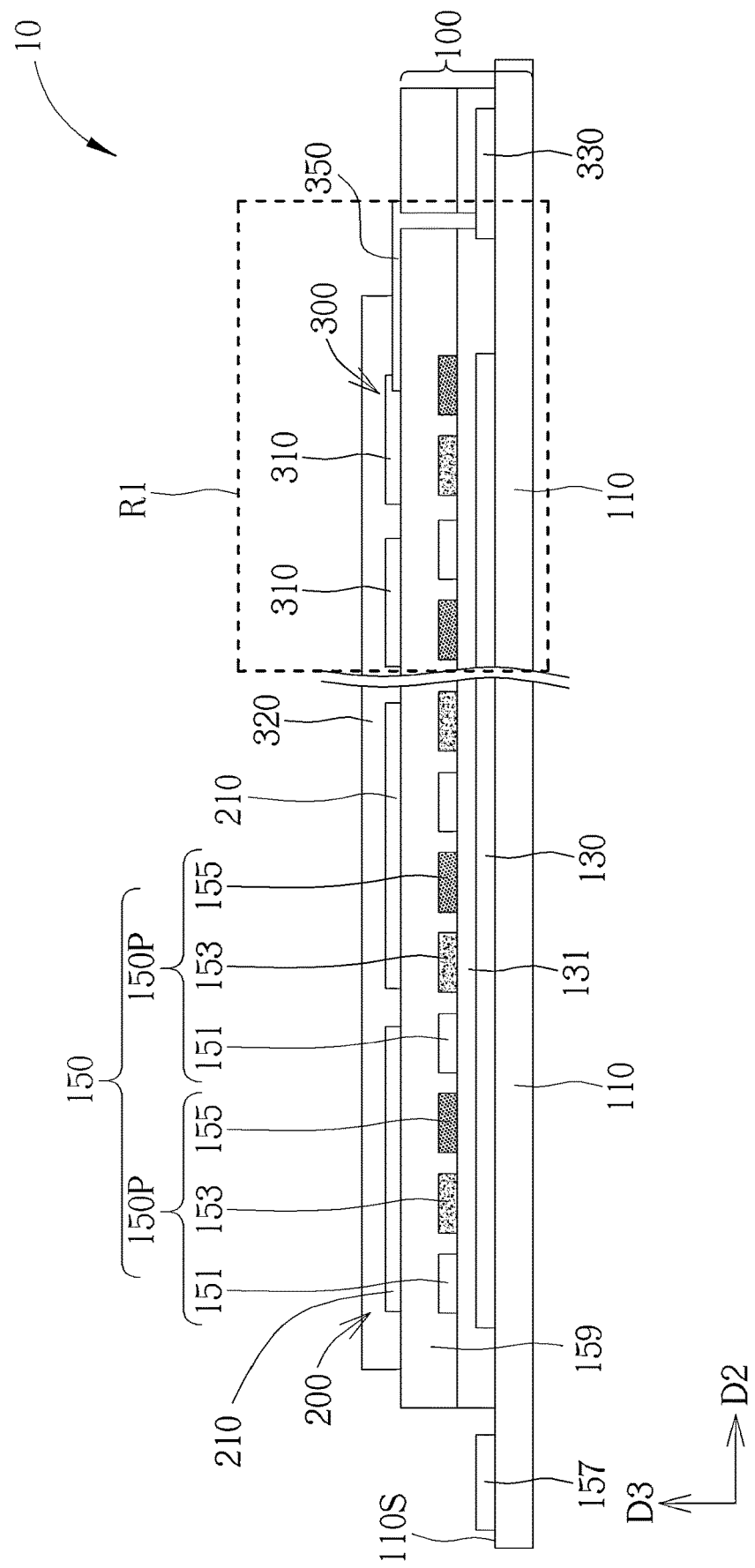
Figure 4:
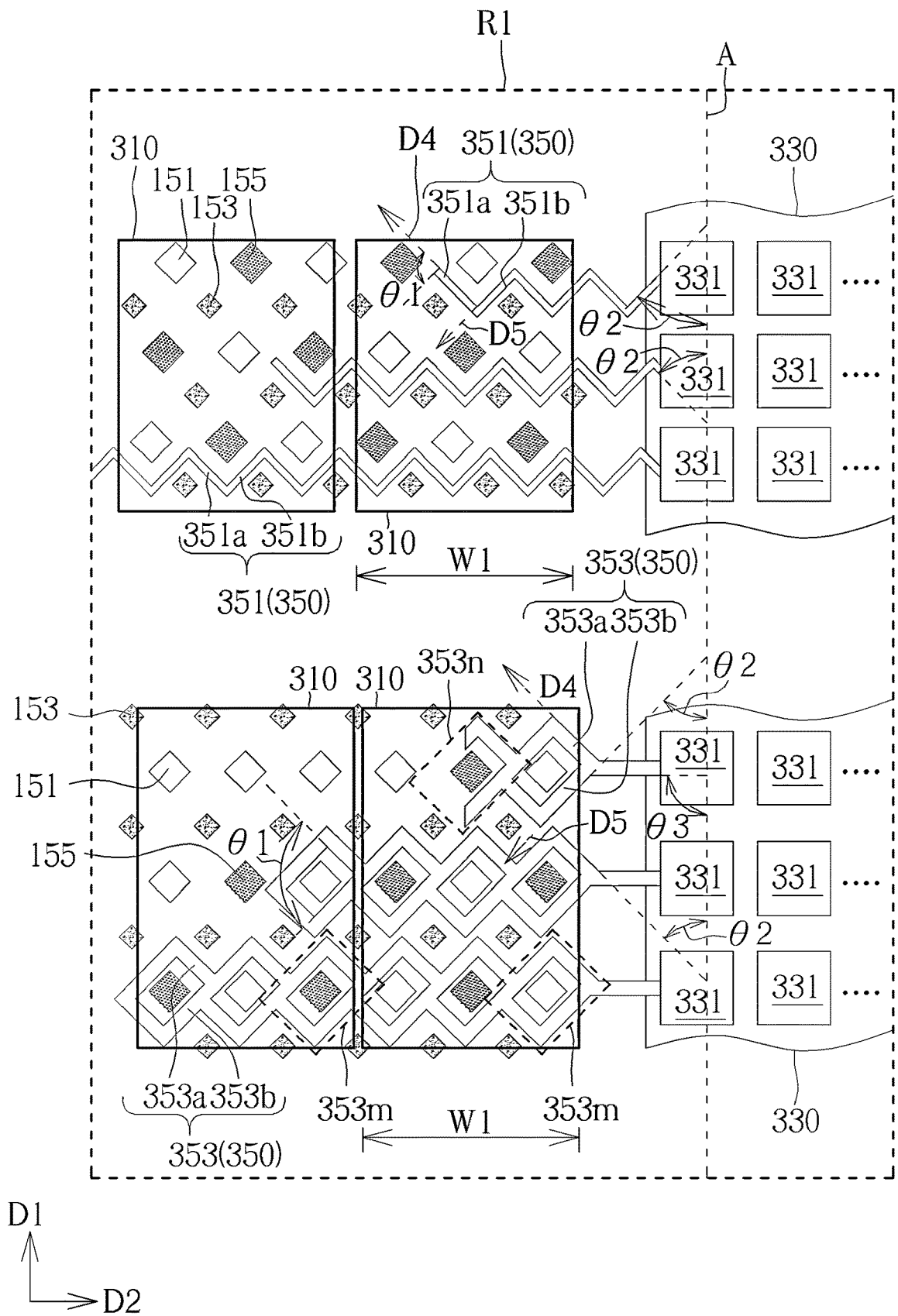
Figure 5:
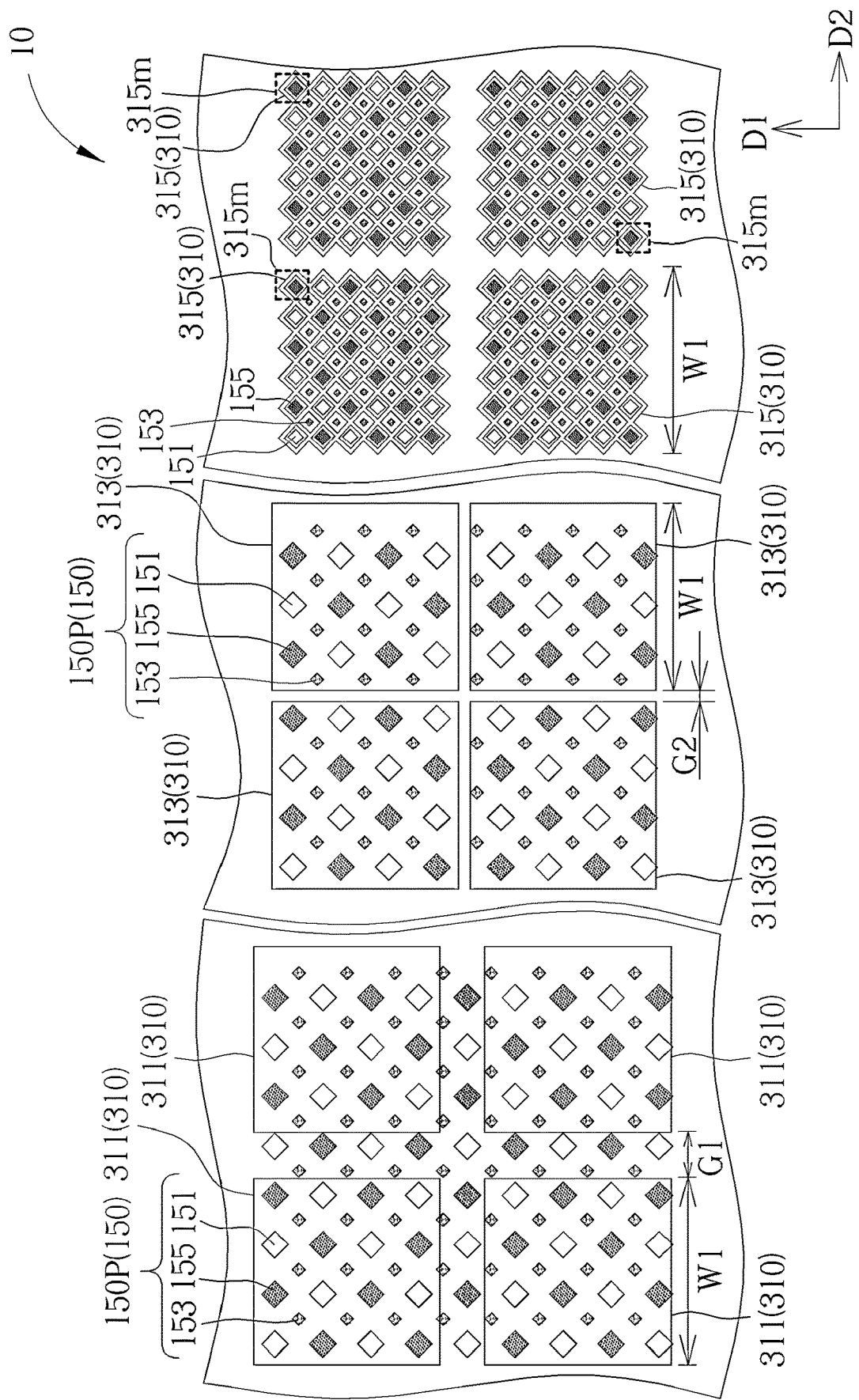

Please refer to FIG. 1 to FIG. 5, which are schematic diagrams illustrating an electronic device 10 according to the first embodiment of the present disclosure, wherein FIG. 1 to FIG. 2 show appearances of the electronic device 10, FIG. 3 shows a cross-sectional view of partial structure the electronic device 10 in non-bending mode, and FIG. 4 to FIG. 5 show a top view of partial elements of the electronic device 10. The electronic device 10 may include a display such as a flexible display 100 as shown in FIG. 1 to FIG. 3. In view of FIG. 1 to FIG. 3, the flexible display 100 may include a substrate 110, a circuit layer 130 and a pixel array 150. The material of the substrate 110 may be any flexible material like plastic (such as polyimide or polyethylene terephthalate), but is not limited thereto. The substrate 110 may further include a flat region 111 and at least one bending region 113, and the bending region 113 may connect to a side of the flat region 111. In the present embodiment, two bending regions 113 may be respectively adjacent to two opposite sides of the flat region 111, and the two bending regions respectively include a bending axis "A" extending along a first direction D1. In other embodiments, the extending directions of the bending axis "A" of the two bending regions 113 may be different from each other. A display region 115 of the electronic device 10 may cover the flat region 111 and at least a portion of the bending region(s) 113, as shown in FIG. 1, but is not limited thereto. In one embodiment, an insulating layer 131 may be, but not limited to, disposed between the circuit layer 130 and the pixel array 150. Person skilled in the art should easily understand the relative relationship of the configuration of the aforementioned bending region 113 and the flat region 111, as well as the covering area of the display region 115, may be further adjusted according to practical product requirements and is not limited to what is shown in FIG. 1. Also, the flat region 111 in the present disclosure may include a non-bending surface related to the bending region 113, and the flat region 111 is not limited to include a flat surface.

In the present embodiment, the bending region 113 and the flat region 111 may be monolithic, that is, both of the bending region 113 and the flat region 111 are different portions of the same structure which is composed of the same material, and the bending region 113 and the flat region 111 are not formed by combining or joining different structures, but it is not limited thereto. The flat region 111 may include the characteristics of being non-bendable or not easily bendable, that is, the flat region 111 may be a substantially planar structure in bending mode or in stretching mode (non-bending mode), but not limited thereto. The bending region 113 may include the characteristics of being bendable, that is, it may be a substantially planar structure in stretching mode and may be a curved structure in bending mode, but not limited thereto. It is noted that, the flat region 111 and the bending region 113 may substantially form a planar structure (not shown in the drawings) in stretching mode, that is, surfaces of the flat region 111 and the bending region 113 may be substantially coplanar, for example, being a plane which is formed by the first direction D1 and a second direction D2. The first direction D1 and the second direction D2 may be two directions which are intersecting substantially perpendicular with each other, for example, the angle between the first direction D1 and the second direction D2 is between 75° and 105° (75°≤the angle≤105°), but is not limited thereto. On the other hand, the bending region 113 may be bent around the bending axis "A" in bending mode. In the present embodiment, the bending region 113 may be bent toward another direction (not shown in the drawing) related to the bending axis "A". The another direction and the first direction D1 may be substantially orthogonal to each other, that is, the another direction may be a direction substantially perpendicular to the substrate 110 (namely, the normal direction of the substrate 110) or a direction substantially perpendicular to the X-Y plane, such as the Z direction. In addition, the bending angle or the bending radius of the bending region 113 with respect to the bending axis "A" is not limited to what is shown in FIG. 1, and which may be further adjusted according to product requirements. For example, as shown in FIG. 2, in another embodiment, the bending region 113 may be further bent around the bending axis "A" until a portion of the bending region 113 is bent to the back side of the flat region 111.

Next, FIG. 3 shows a cross-sectional view of the electronic device in the second direction D2 and a third direction D3, and the third direction D3 may be substantially perpendicular to a surface 110S of the substrate 110 or be substantially perpendicular to the X-Y plane. The circuit layer 130 may be disposed on the surface 110S of the substrate 110. The pixel array 150 may be disposed on the circuit layer 130. The pixel layer 150 may include a plurality of pixels 150P. The pixel 150P may include a plurality of sub-pixels for displaying the same color or different colors, such as a sub-pixel 151, a sub-pixel 153 and a sub-pixel 155 for respectively displaying red, blue or green colors, but not limited thereto. In other embodiments, the pixel 150P may also include a sub-pixel for displaying other colors, such as a yellow sub-pixel. In the present embodiment, the pixel array 150 may be a self-illuminating module array, such as a light emitting diode display array. In other words, the sub-pixel 151, the sub-pixel 153 and the sub-pixel 155 may respectively include at least one light emitting diode and other elements for providing a display function, and the sub-pixel 151, the sub-pixel 153 and the sub-pixel 155 may respectively correspond to the electrical elements of the circuit layer 130, such as a thin film transistor element (not shown in the drawings), a storage capacitor element (not shown in the drawings) or the like. Furthermore, the pixel array 150 may be driven by a driving circuit 157 disposed on the substrate 110. In one embodiment, a thin film encapsulation (TFE) layer 159 may be disposed on the pixel array 150. In another embodiment, the pixel 150P may include an inorganic light emitting diode, an organic light emitting diode (OLED), micro light-emitting diode, mini light-emitting diode, quantum dot light emitting diodes (QLED/QDLED), nano wire light-emitting diode or bar type light-emitting diode, but not limited thereto. In other embodiments, the pixel array 150 may also include a non-self-illuminating module array, such as a liquid crystal display module. While the pixel array 150 includes the non-self-illuminating module array, the electronic device 10 may further include a backlight module (not shown in the drawings), and the backlight module may be disposed under the substrate 110.

As shown in FIG. 3, the electronic device 10 may further include a touch sensor 200 disposed on the flexible display 100. The touch sensor 200 may include a plurality of touch electrodes 210; the touch electrodes 210 may be in an array arrangement. The material of the touch electrodes 210 may include a transparent conductive material, a metal material, a suitable material or a combination thereof, but not limited thereto. The transparent conductive material may include indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO) or the like, but not limited thereto. Also, the touch sensor 200 may also be driven by a driving circuit 330 disposed on the substrate 110 or other driving circuit (not shown in the drawings).

On the other hand, the electronic device 10 may further include a fingerprint sensor 300 which may be also disposed on the flexible display 100. The fingerprint sensor 300 may be disposed adjacent to the touch sensor 200. For example, the fingerprint sensor 300 may be a capacitive fingerprint sensor, but not limited thereto. The fingerprint sensor 300 may include a plurality of sensing electrodes 310, and the sensing electrodes 310 may be in an array arrangement. The sensing electrodes 310 may be disposed on the pixel array 150. In one embodiment, the touch electrodes 210 of the touch sensor 200 may be arranged together with the sensing electrodes 310 of the fingerprint sensor 300, for example being both included the same or different conductive films, but not limited thereto. As an example, the distribution density of the sensing electrodes 310 may be less than the distribution density of the touch electrodes 210, but not limited thereto. In some embodiments, the touch electrodes 210 and the sensing electrodes 310 may be disposed at two opposite sides of the substrate 110 respectively, for example being disposed at the left side and the right side as shown in FIG. 3. An insulating layer 320 may be further disposed on the touch sensor 200 and the fingerprint sensor 300, covering on the touch electrodes 210 and the sensing electrodes 310. However, in other embodiments, the touch sensor may also be omitted according to product requirements, that is, the electronic device may only include the fingerprint sensor without disposing the touch sensor. Accordingly, only the sensing electrodes of the fingerprint sensor are disposed on the pixel array in the array arrangement (this embodiment is not shown in the drawings). Also, the sensing electrodes 310 may be driven by different driving methods to detect touching or fingerprint sensing at different time points. In other words, the touch electrodes 210 may be replaced by the sensing electrodes 310, or the sensing electrodes 310 may include both of the touch function and the fingerprint sensing function, but not limited thereto.

The material of the sensing electrodes 310 may be similar to those of the touch electrodes 210, and which will not be redundantly described hereinafter. Furthermore, the sensing electrodes 310 may also be driven by the driving circuit 330 disposed on the substrate 110. In one embodiment, the formation of the driving circuit 330 may be optionally integrated with the formation of the circuit layer 130, that is, the driving circuit 330 and the circuit layer 130 of the electronic device 10 may be formed together in the same conductive layer, and also, may include the same or similar conductive materials, but not limited thereto. In the present embodiment, the sensing electrodes 310 may be connected to the driving circuit 330 via a plurality of signal lines 350, to electrically connect the fingerprint sensor 300 to the driving circuit 330. However, in another embodiment, the fingerprint sensor 300 may also be electrically connected to the driving circuit 330 through other methods, to omit the disposing of the signal lines 350. With the sensing electrodes 310, the sensing electrodes 310 may be used to scan the ridges and valleys of the fingerprint by sensing the charge difference, the temperature difference or pressure difference caused by the finger, when the finger touches the electronic device 10, thereby identifying the fingerprint patterns.

FIG. 4 shows a top view of an area R1 in FIG. 3. Precisely speaking, as shown in FIG. 4, the driving circuit 330 may include a plurality of driving units 331, and the driving circuit 330 may be electrically connected to the sensing electrodes 310 through the signal lines 350. It is noted that, a width W1 of the sensing electrode 310 in the second direction D2 is for example about 50 μm to 300 μm (50 μm≤W1≤300 μm), such as 100 μm or 200 μm, therefore, one sensing electrode 310 may correspond to several sub-pixels such as the sub-pixel 151, the sub-pixel 153 and the sub-pixel 155 underneath at the same time. The width W1 may be the greatest width of the sensing electrode 310 in the second direction D2, but not limited thereto. The signal lines 350 may be disposed in the spacing between the sub-pixel 151, the sub-pixel 153 and the sub-pixel 155 while the signal lines 350 are connected to the sensing electrodes 310, to reduce the amount of light blocked by the sub-pixel 151, the sub-pixel 153 and the sub-pixel 155. In one embodiment, at least one signal line 351 may include a plurality of branches 351a and a plurality of branches 351b, the branches 351a and the branches 351b may be alternately arranged in sequence and respectively extend along different directions (for example a direction D4 and a direction D5, but not limited thereto). Then, the signal lines 351 may be disposed in the spacing between the sub-pixel 151, the sub-pixel 153 and the sub-pixel 155. In other words, the signal lines 351 may include a zig-zag structure. In one embodiment, the plurality of branches 351a may also extend along several different directions, but not limited thereto. The signal lines 351 may include different lengths in the second direction D2 to connect electrically to different sensing electrodes 310. For example, a signal line 351 may electrically connect to one of the sensing electrodes 310 that is adjacent to the driving circuit 330, another signal line 351 may electrically connect to another sensing electrode 310, and the two signal lines 351 may include different lengths in the second direction D2, but is not limited thereto. An angle θ1 between the direction D4 and the direction D5 is for example between zero degree to 90 degrees (0°≤θ1≤90°), such as 30 degrees or 60 degrees, but not limited thereto. In one embodiment, an angle θ2 between the signal lines 351 and the extending direction (for example the first direction D1) of the bending axis "A" may be greater than zero degree and less than or equal to 90 degrees (0°≤θ2≤90°), for example being 30 degrees, 45 degrees, 60 degrees or 75 degrees, but not limited thereto.

Person skilled in the art should easily understand that while disposing the signal lines 350 in the spacing between the sub-pixel 151, the sub-pixel 153 and the sub-pixel 155, the disposing structure of the signal lines 350 is not limited to the aforementioned zig-zag structure and may further include other types. For example, in another embodiment, a plurality of branches 353a and a plurality of branches 353b of at least one of the signal lines 353 may also be continuously arranged side by side and extend in different directions (for example the direction D4 and the direction D5) at the same time, and the signal lines 353 may generally present a mesh structure. Accordingly, the corresponding sub-pixel 151, the corresponding sub-pixel 153 or the corresponding sub-pixel 155 may be exposed from mesh portions 353m or mesh portions 353n that are consisted by the branches 353a and the branches 353b. In other words, the signal lines 353 may include a plurality of openings for exposing the sub-pixel 151, the sub-pixel 153 or the sub-pixel 155, so that, one of the openings may be corresponded to at least one of the sub-pixel 151, the sub-pixel 153 and the sub-pixel 155. Also, the branch(es) 353a and the branch(es) 353b may constitute a complete mesh portion 353m, or may also constitute an incomplete mesh portion 353n, so that, the signal lines 353 may contact to the corresponding sensing electrodes 310 through the complete mesh portions 353m or the incomplete mesh portions 353n thereof. In some embodiments, since the signal lines 350 and the sensing electrodes 310 are disposed in different layers, the signal lines 350 may include at least one contact portion (such as two contact portions, not shown in the drawings), or at least two contact portions (such as more than two contact portions, not shown in the drawings) electrically connected to one of the sensing electrodes 310. For example, the contact portion may include a through hole or other electrical connection structure, but not limited thereto. It may include an angle between different portions of the signal lines 353 and the extending direction of the bending axis "A", such as the angle θ2 or the angle θ3, and the angle may be greater than zero degree and less than or equal to 90 degrees (0°<θ2 or θ3≤90°, such as 30 degrees, 45 degrees, 60 degrees, 75 degrees or 90 degrees, but not limited thereto. It is noted that, although the signal lines 350 are all exemplified as a regular zig-zap structure (with the size of each sharp portion and each concave portion of the zig-zap structure being substantially the same with each other) or a regular mesh structure (with the size of each mesh portion of the mesh structure being substantially the same with each other) in each of the aforementioned embodiments, the practical fabricating process of the signal lines 350 is not limited thereto. The branches of the signal lines may also have more than two extending directions under different disposing requirements to present an irregular zig-zag structure or an irregular mesh structure.

On the other hand, as shown in FIG. 5, the sensing electrodes 310 may also include various aspects according to practical disposing requirements. For example, in one embodiment, a distribution density of at least a portion of the sensing electrodes 311 is for example about 25 to 50 sensing electrodes per square millimeter (25-50 items/mm²), such as 30 or 40 sensing electrodes per square millimeter. Then, the sensing electrodes 311 may have a relatively greater spacing G1 therebetween, for example, being about 30 μm to 50 μm (30 μm≤G1≤50 μm), such as 35 μm or 45 μm, but not limited thereto. The spacing G1 may be the smallest distance between two adjacent sensing electrodes 311. Accordingly, a portion of the sub-pixel 151, the sub-pixel 153 or the sub-pixel 155 may be disposed at the spacing G1 between the sensing electrodes 311, thereby being exposed therefrom, as shown in FIG. 5. In this way, while the signal lines 350 (as shown in FIG. 3 and FIG. 4) are provided to electrically connect the sensing electrodes 311, the signal lines 350 may obtain a relative greater process window thereby. On the other hand, another portion of the sensing electrodes 313 may optionally include a relatively greater distribution density, for example the distribution density being increased to about 100 to 400 per square millimeter (100-400 items/mm²), that is, a spacing G2 between the sensing electrodes 313 is shrunken for example to about 5 μm to 10 μm (5 μm≤G2≤10 μm), such as being 7 μm, but not limited thereto. The spacing G2 may be the smallest distance between two adjacent sensing electrodes 313. Accordingly, since the spacing G2 between the sensing electrodes 313 is smaller, the sub-pixel 151, the sub-pixel 153 or the sub-pixel 155 may not be exposed therefrom. Then, the disposing of the sensing electrodes 313 may be more compact to improve the resolution of the fingerprint sensor 300. Also, a portion of the sensing electrodes 315 may be optionally formed into a metal mesh structure, with traces being formed by metal with good conductivity (such as gold, silver, copper, aluminum, tungsten or an alloy of above metal, but not limited thereto) to form at least a portion of the sensing electrodes 315. In other words, the sensing electrodes 315 may further include a plurality of mesh portions 315m, which also includes a plurality of openings for exposing the sub-pixel 151, the sub-pixel 153 or the sub-pixel 155, and the sub-pixel 151, the sub-pixel 153 or the sub-pixel 155 may be disposed within the openings of the mesh portions 315m to be exposed therefrom. In this way, the influences to the display brightness of the pixel array 150 caused by the sensing electrodes 315 may be reduced. Person skilled in the art should realize that although the present embodiment may include the sensing electrodes 311, the second electrodes 313 and the sensing electrodes 315 with various types at the same time, the practical arrangement is not limited thereto. In other embodiments, a single type of the sensing electrodes may be optionally disposed based on the product requirements, for example, only disposing the sensing electrodes 315 to reduce the influences to the display brightness, or only disposing the sensing electrodes 313 to improve the resolution, or only disposing the sensing electrodes 311 to improve the processing window of the wires, but not limited thereto. The advantages of the above mentioned sensing electrodes are only for example, and which may actually have more or other advantages, and the present disclosure is not limited thereto.

Figure 6:
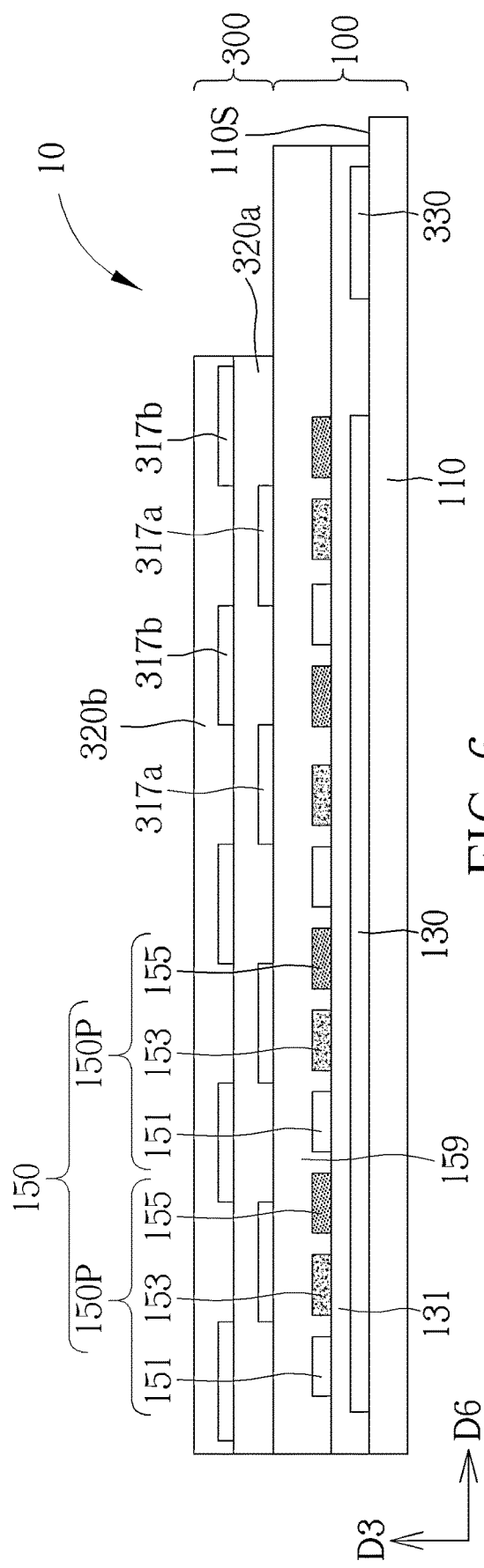
FIG. 6 is a schematic diagram illustrating another disposing view of sensing electrodes in a display of the electronic device.
Figure 7:
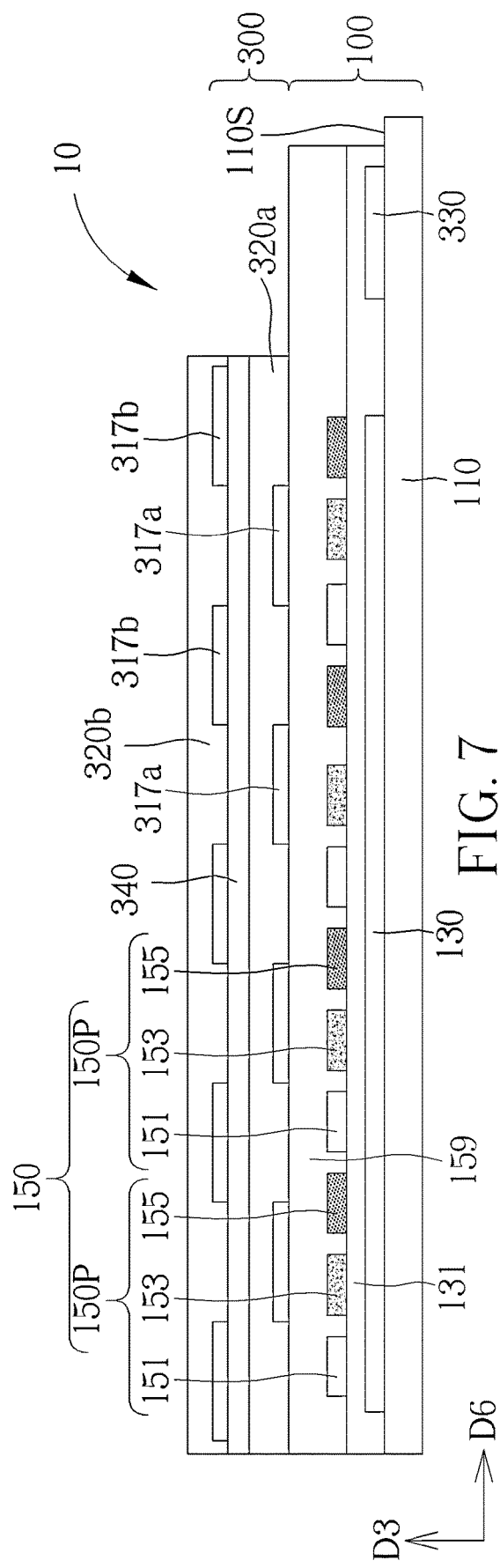
FIG. 7 is a schematic diagram illustrating another disposing view of sensing electrodes in a display of the electronic device.

In addition, as shown in FIG. 6 and FIG. 7, in another embodiment, the fingerprint sensor 300 may further include a plurality of first sensing electrodes 317a and a plurality of second sensing electrodes 317b, to form a mutual-capacitive electrode array. For example, one of the first sensing electrode 317a and the second sensing electrode 317b may be a driving electrode, and the other one of the first sensing electrode 317a and the second sensing electrode 317b may be a sensing electrode. It is noted that, FIG. 6 and FIG. 7 only illustrate a partial cross-sectional view of the electronic device. Precisely speaking, the first sensing electrodes 317a and the second sensing electrodes 371b may be two electrode layers, which are formed successively by similar or different processes, but not limited thereto. The first sensing electrodes 317a are for example parallelly arranged along a first axis (for example the first direction D1 as shown in FIG.

1), and the second sensing electrodes 317b are for example parallelly arranged along a second axis (for example the second direction D2 as shown in FIG. 1). The first sensing electrodes 317a and the second sensing electrodes 317b may be alternately arranged in another direction D6 that is different from the first direction D1 and the second direction D2, as shown in FIG. 6. The direction D6 for example has an angle of 45 degrees with the first direction D1 and the second direction D2, but is not limited thereto. Also, an insulating layer 320a and an insulating layer 320b may respectively cover on the first sensing electrodes 317a and the second sensing electrodes 317b, for isolating the first sensing electrodes 317a and the second sensing electrodes 317b. In other embodiments, the fingerprint sensor 300 may also include a self-capacitive electrode array, for example, only disposing the first sensing electrodes 317a or only disposing the second sensing electrodes 317b. As an example, only the first sensing electrodes 371a are disposed to provide driving and sensing function, but not limited thereto.

Moreover, as shown in FIG. 7, another substrate 340 may be further disposed between the first sensing electrodes 317a and the second sensing electrodes 317b, and the second sensing electrodes 317b may be disposed on the substrate 340. The material of the substrate 340 includes a dielectric material, an insulating material, or other suitable material, so that, the distance between the first sensing electrodes 317a and the second sensing electrodes 317b may be enlarged to reduce the parasitic capacitance between the first sensing electrodes 317a and the second sensing electrodes 317b to achieve better sensing signals thereby.

Through these arrangements, the issues that the flexible display 100 is frequently bent and used to affect the overall performance of the electronic device 10 may be improved. However, person skilled in the arts should easily realize the electronic device 10 of the present disclosure may also include another type of arrangement in order to meet the practical product requirement. The following description will detail the different embodiments of the electronic device in the present disclosure. To simplify the description, the description detail following will the dissimilarities among the different embodiments and the identical features will not be redundantly described. In order to compare the differences between the embodiments easily, the identical components in each of the following embodiments are marked with identical symbols.

Figure 8:
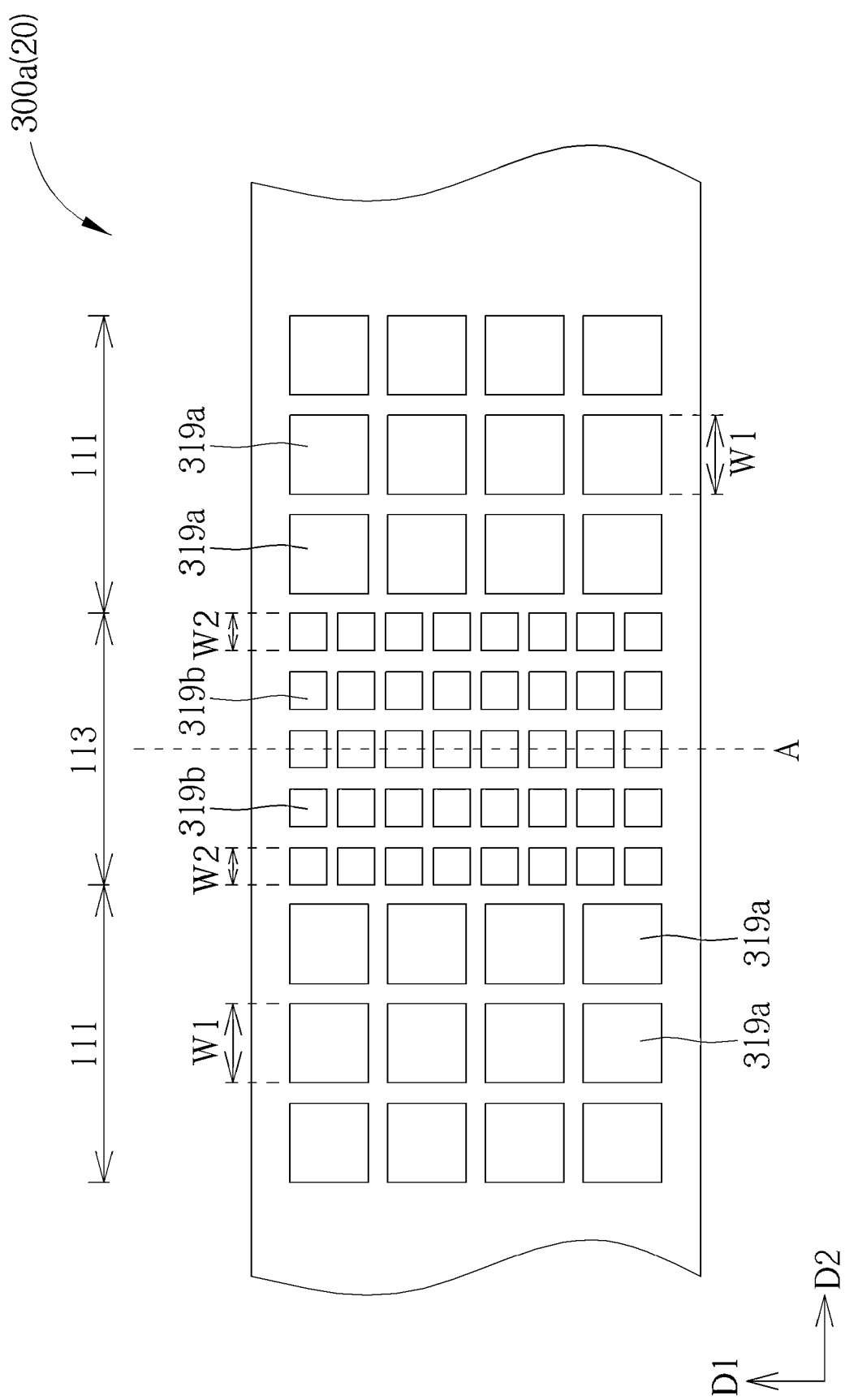
Figure 9:
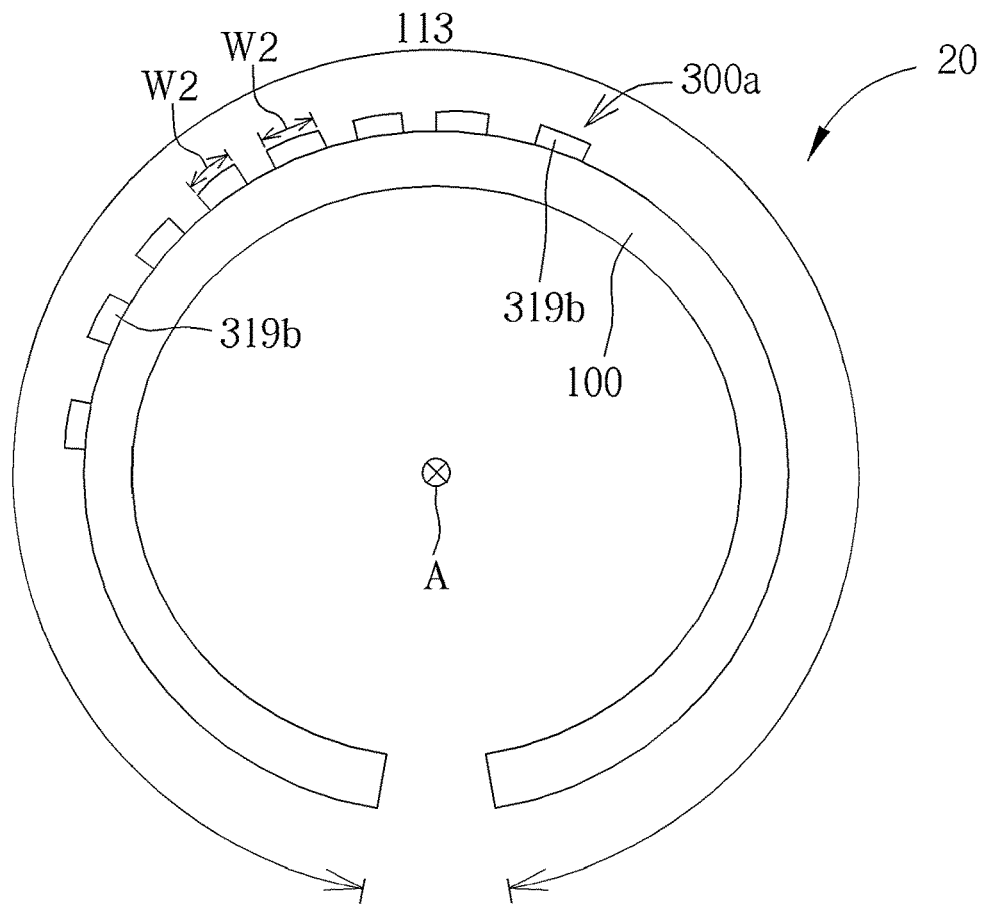
Figure 10:
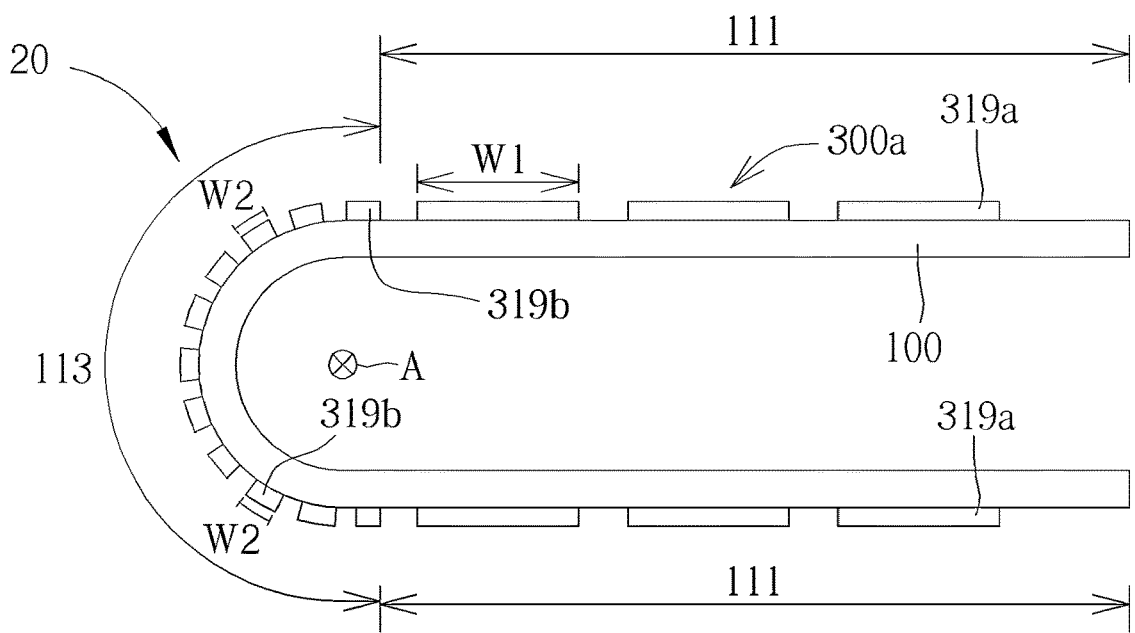

Please refer to FIG. 8 to FIG. 10, which are schematic diagrams illustrating an electronic device 20 according to the second embodiment of the present disclosure, wherein FIG. 8 shows the disposing electrodes within the display substrate of the electronic device 20, and FIG. 9 and FIG. 10 show the appearance of the electronic device in bending mode. The structure of the electronic device 20 of the present embodiment is substantially the same as that of the aforementioned first embodiment, and, which also includes the flexible display 100 and the fingerprint sensor 300a disposed on the flexible display 100. All similarity between the present embodiment and the aforementioned embodiment will not be redundantly described hereinafter. The difference between the present embodiment and the aforementioned embodiment is mainly in that the distribution density of the electrode array of the fingerprint sensor 300a may be different in various regions.

Precisely speaking, as shown in FIG. 8, the flexible display 100 of the present embodiment also includes the flat region 111 and the bending region 113, and two opposite sides of the bending region 113 may be adjacent to two flat regions 111 respectively, but not limited thereto. In the present embodiment, a width W2 of the sensing electrodes 319b may be shrunken to for example about 20 µm to 30 µm (20 µm≤W2≤30 µm), such as 25 µm, so that, the distribution number of the sensing electrodes 319b per unit area may be increased, thereby performing a relative greater distribution density. In the present embodiment, the distribution density of the sensing electrode 319b within the bending region 113 may be greater than the distribution density of the sensing electrode 319a within the flat region 111. Then, the width W1 of the sensing electrodes 319a disposed in the flat region 111 may be different from the width W2 of the sensing electrodes 319b disposed in the bending region 113, so that, the sensing electrodes 319a within the flat region 111 and the sensing electrodes 319b with in the bending region 113 may include different distribution densities according to the bendable function of the substrate 110, but is not limited thereto. For example, the width W1 and the width W2 may be the greater width in the second direction D". In another embodiment, the sensing electrodes 319a within the flat region 111 and the sensing electrodes 319b within the bending region 113 may have different spacing or pitches (not shown in the drawings), or the sensing electrodes 319a within the flat region 111 and the sensing electrodes 319b within the bending region 113 may have both different widths and pitches (not shown in the drawings), to adjust the distribution number of the sensing electrodes 319a or the sensing electrodes 319b per unit of the flat region 111 and the bending region 113 to obtain different distribution densities. Also, the spaced distance between the sensing electrodes 319a within the flat region 111 and the spaced distance between the sensing electrodes 319b within the bending region 113 may also be different. For example, the spaced distance between the sensing electrodes 319b within the bending region 113 may be smaller, and the spaced distance between the sensing electrodes 319a within the flat region 111 may be greater, but not limited thereto.

With these arrangements, the resolution and the recognition of the sensing electrodes 319b disposed in the bending region 113 may be improved. Even if the electronic device 20 is used in bending mode, the sensing electrodes 319b may still be attached to a large area of fingerprint surfaces, thereby generating a sensing signal. Thus, the electronic device 20 of the present embodiment may be a wearable electronic device as shown in FIG. 9. The electrode array of the aforementioned fingerprint sensor 300a may be disposed on the wearable electronic device, wherein the sensing electrodes 319b with a relative smaller width W2 may be disposed in the bending region 113 of the wearable electronic device to match the fingerprint recognition function of the wearable electronic device in bending mode. At this time, the user only has to provide a little pressure to fit the fingers easily on the surface of the wearable electronic device, followed by using the high-density sensing electrodes 319b for fingerprint sensing. Otherwise, the electronic device 20 of the present embodiment may also be a foldable electronic device as shown in FIG. 10. The electrode array of the aforementioned fingerprint sensor 300a may be disposed on the foldable electronic device, wherein the sensing electrodes 319b with a relative smaller width W2 may also be disposed in the bending region 113 of the foldable electronic device to match the fingerprint recognition function of the foldable electronic device in bending mode. At this time, since the high-density sensing electrodes 319b are disposed within the bending region 113, the foldable electronic device may still perform the fingerprint recognition even in bending mode.

Please refer to FIG. 11 to FIG. 12, which are schematic diagrams illustrating an electronic device 30 according to the third embodiment of the present disclosure, wherein FIG. 11 and FIG. 12 respectively show a top view of the electronic device in stretching mode. The structure of the electronic device 30 of the present embodiment is substantially the same as that of the aforementioned first embodiment, and also includes the flexible display 100 and the fingerprint sensor 300 disposed on the flexible display 100. All similarity between the present embodiment and the aforementioned embodiment will not be redundantly described hereinafter. The difference between the present embodiment and the first embodiment is mainly in the disposing of the circuit.

As shown in FIG. 11, a peripheral region 116 is further disposed on at least one side of the display region 115 of the electronic device 30 in the present embodiment, and a circuit of the electronic device 30 and/or the fingerprint sensor 300 may be disposed in the peripheral region 116. In the present embodiment, the peripheral region 116 is respectively disposed at two opposite sides of the display region 115, and an integrated circuit 160 of the electronic device 30 and/or an integrated circuit 360 of the fingerprint sensor 300 are respectively disposed in the periphery region 116, but not limited thereto. For example, a demux 161 and a demux 361 may be optionally disposed in the peripheral region 116, wherein the driving circuit 330 of the fingerprint sensor 300, the demux 361, and the integrated circuit 360 are disposed in the peripheral region 116 at the right side of the display region 115, and the driving circuit 160 of the electronic device 30 and the demux 161 are disposed in the peripheral region 116 at the left side of the display region 115. Furthermore, the signal lines (such as the signal lines 165) within the display region 115 may extend along the second direction D2 to electrically connect to the demux 161 and the demux 361, and to further electrically connect to the integrated circuit 160 or the integrated circuit 360 to the two sides through a wire 163 and a wire 363. In one embodiment the demux 161 and the demux 361 may be selected as a 1-to-3 demux, for example a wire 163 connected to the integrated circuit 160 may be divided into three signal lines (such as the signal lines 165 and the like), but not limited thereto. The demux 161 and/or the demux 361 may also be a 1-to-6 demux or a 1-to-10 demux to reduce the fabricating cost of the electronic device 30. Also, the wire 163 and/or the wire 363 may further include a plurality of mesh portions 163a and a plurality of mesh portions 363a. In one embodiment, the wire 163 may include the mesh portions 163a extending along different directions, so that, the wire 163 may withstand a larger bending stress to reduce the influences of frequent bending as being disposed in the bending region 113. The design of the wire 363 may be similar to the wire 163. In other embodiments, the design of the wire 163 and the wire 363 is not limited to meshed design, as long as the design for reducing the stress may also be applied on the portion of the wire 163 and the wire 363 within the bending region 113. On the other hand, a flexible printed circuit (FPC) board 270 may be further disposed outwardly on the peripheral region 116 at one side of the display region 115, and other circuits may be optionally disposed on the flexible printed circuit board 270.

It is noted that, the circuits of the electronic device 30 and/or the fingerprint sensor 300 may be optionally disposed in the bending region 113 or the flat region 111. For example, in one embodiment, the demux 161, the demux 361, or the driving circuit (such as the driving circuit 330) of the electronic device 30 and/or the fingerprint sensor 300 may be disposed in the flat region 111. In other embodiments, the driving circuit (such as the driving circuit 330) of the fingerprint sensor 300 may also be disposed in the bending region 113, and the demux 161, the demux 163, the integrated circuit 169 and/or the integrated circuit 360 are disposed in the flat region 111, but not limited to. In FIG. 12, a circuit configuration is illustrated, but is not limited thereto.

Figure 13:
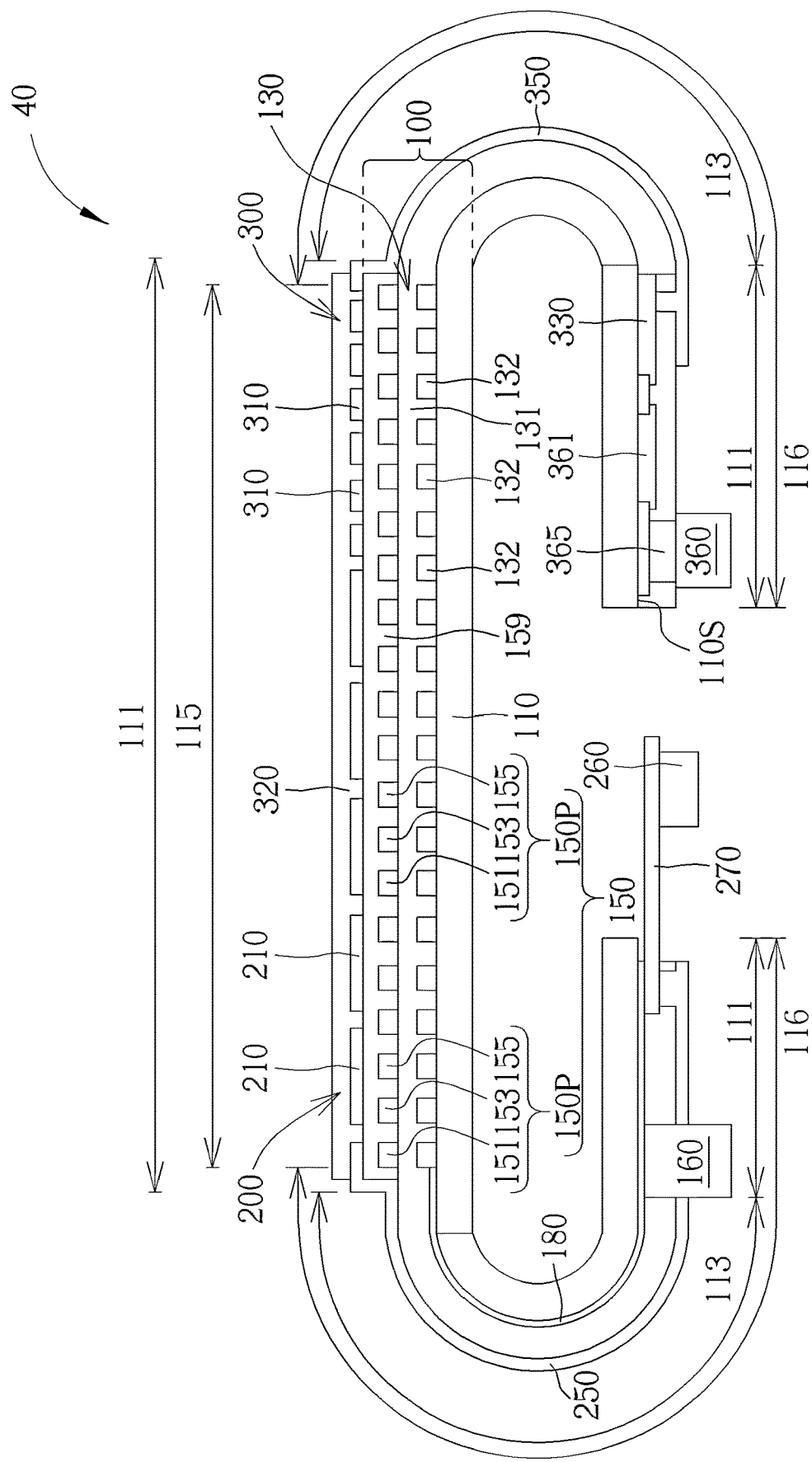
FIG. 13 is a schematic diagram illustrating an electronic device according to a fourth embodiment of the present disclosure.

Please refer to FIG. 13, which is a schematic diagram illustrating an electronic device 40 according to the fourth embodiment of the present disclosure, which shows an appearance and a cross-section view of the electronic device 40 in bending mode. The structure of the electronic device 40 of the present embodiment is substantially the same as that of the aforementioned embodiments, and which also includes the flexible display 100 and the touch sensor 200 and the fingerprint sensor 300 disposed on the flexible display 100. In addition, the electronic device 40 of the present embodiment also includes the display region 115 and the peripheral regions 116 disposed at two opposite sides of the display region 115, and all similarity between the present embodiment and the aforementioned embodiments will not be redundantly described hereinafter. The difference between the present embodiment and the aforementioned embodiments is mainly in disposing all of the driving circuit 330 of the fingerprint sensor 300, the demux 361 and the integrated circuit 360 in the peripheral region 116 to save space or adjust the element arrangement of the electronic device 40 by bending the portion (namely the peripheral region 116 at the right side of the electronic device 40) having the circuit disposed thereon to the back side of the electronic device 40. The integrated circuit 360 of the fingerprint sensor 300 is disposed on the surface 110S of the substrate 110 through a conductive plastic 365 such as the anisotropic conductive film (ACF). Also, the circuit layer 130 may include several switching elements 132 such as the thin film transistors, but not limited thereto. An insulating layer 131 is disposed on the switching element 132.

On the other hand, the integrated circuit 160 of the flexible display 100 is disposed in the peripheral region 116 at another side of the electronic device 40, and the integrated circuit 160 is electrically connected to the pixel array 150 through a signal line 180, and is further connected to a flexible printed circuit board 270 to electrically connect an integrated circuit 260 disposed on the flexible printed circuit board 270. The sensing electrodes 210 of the tough sensing element 200 is additionally connected to the flexible printed circuit board 270 through a signal line 250, to electrically connect to the integrated circuit 260. It is noted that, the integrated circuit 260 of the touch sensor 200 and the integrated circuit 160 of the flexible display 100 are both disposed in the peripheral region 116 at the another side of the electronic device 40, so that, the portion of the electronic device 40 where includes the circuits of the flexible display 100 and the touch sensor 200 thereon may bent to the back side for saving space or adjusting element arrangement of the electronic device 40.

The electronic device of the present disclosure is not limited to the aforementioned display device, and may further include a lighting device, an antenna device, a sensor device or a tiled device, but is not limited thereto. The electronic device may optionally include a non-rectangular electronic device, a foldable electronic device or a flexible electronic device, such as a flexible liquid crystal display device or a flexible light emitting diode display device. The antenna device may be a liquid crystal antenna, but the present disclosure is not limited thereto. The tiled device may be a tiled display device or a tiled antenna joint device, but the present disclosure is not limited thereto. It is noteworthy that the electronic device may be any variants, arrangements or combinations of the above, but the present disclosure is not limited thereto. In addition, the term "bendable" or "flexible" referred in the present disclosure may mean the electronic device may be bent, bended, folded, stretched, flexed or other similar deformations. In the present disclosure, the term "non-rectangular" means the appearance of the electronic device may be non-rectangular, or the pixel array of the electronic device may include a non-rectangular overall appearance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a flexible display comprising a plurality of light emitting diodes;
   a sensor electrode disposed on the flexible display; and
   a plurality of signal lines electrically connected to the sensor electrode, wherein the electronic device has a bending region, and a flat region connected to the bending region, the plurality of signal lines comprises a mesh structure, the mesh structure comprises a first opening, and a second opening adjacent to the first opening, in the at least a portion of the bending region, one of the plurality of light emitting diodes is in the first opening, another one of the plurality of light emitting diodes is in the second opening, and a displaying color of the one of the plurality of light emitting diodes in the first opening is different from a displaying color of the another one of the plurality of light emitting diodes in the second opening, wherein the electronic device has a bending axis, and an angle between the bending axis and an extension direction of one of the plurality of signal lines is greater than 0 degree and less than or equal to 90 degrees.

2. The electronic device according to claim 1, wherein one of the plurality of signal lines comprises a complete mesh portion, and an incomplete mesh portion adjacent to the complete mesh portion, one of the plurality of light emitting diodes disposes in an opening of the complete mesh portion, another one of the plurality of light emitting diodes disposes in an opening of the incomplete mesh portion, and a display color of the one of the plurality of light emitting diodes disposes in the opening of the complete mesh portion is different from a display color of the another one of the plurality of light emitting diodes disposes in the opening of the incomplete mesh portion.

3. The electronic device according to claim 1, wherein one of the plurality of signal lines comprises a plurality of first branches and a plurality of second branches, and the plurality of first branches and the plurality of second branches respectively extend along different directions.

4. The electronic device according to claim 1, wherein a portion of the sensing electrode is disposed in the bending region.

5. The electronic device according to claim 1, wherein the flexible display comprises:
   a substrate;
   a circuit layer disposed on the substrate; and
   a pixel array disposed on the circuit layer.

* * * * *